United States Patent
Leonard et al.

[11] 3,820,749
[45] June 28, 1974

[54] TREE WATERING STAND

[76] Inventors: Thomas R. Leonard, 1558 N. Shepherd Dr., Camarillo, Calif. 93010; James R. Birkenshaw, 223 Teloma Dr., Ventura, Calif. 93003

[22] Filed: Apr. 13, 1973

[21] Appl. No.: 350,722

[52] U.S. Cl. .................................. 248/44
[51] Int. Cl. ................................ A47g 33/12
[58] Field of Search ..................... 248/44–48

[56] References Cited
UNITED STATES PATENTS

| | | | |
|---|---|---|---|
| 1,662,579 | 3/1928 | Kirshner | 248/46 |
| 2,485,081 | 10/1949 | Ahrens | 248/46 |
| 2,746,700 | 5/1956 | Barbera | 248/44 |
| 2,875,968 | 3/1959 | Ekola | 248/48 |
| 2,893,668 | 7/1959 | Applegate | 248/44 |
| 2,899,156 | 8/1959 | Marcucci | 248/48 |
| 3,033,505 | 5/1962 | Brown | 248/44 |
| 3,353,773 | 11/1967 | Budd | 248/44 |

FOREIGN PATENTS OR APPLICATIONS

| | | | |
|---|---|---|---|
| 488,751 | 7/1938 | Great Britain | 248/44 |

*Primary Examiner*—William H. Schultz
*Attorney, Agent, or Firm*—Lindenberg, Freilich & Wasserman

[57] ABSTRACT

There is provided an arrangement which may be used in an apartment, home, or business establishment, for holding a tree in a vertical position while supplying it with water.

5 Claims, 2 Drawing Figures

PATENTED JUN 28 1974　　　　　　　　　　　　3,820,749

TREE WATERING STAND

BACKGROUND OF THE INVENTION

This invention relates to arrangements for supporting a tree in a vertical position, in a container holding water for the tree.

During the Christmas season, many people purchase trees for the purpose of setting them up in their homes for celebrating the holiday. The Christmas tree which is brought into the house, after a period of time begins to dry out. It then becomes a potential fire hazard, which becomes incendiary if a spark from any source occurs in its vicinity, or it may be ignited due to the heat caused by the electrical decorations which are so often placed upon it.

The tree can be kept from drying out if its trunk is placed in water. However, to maintain the tree vertical, while keeping its trunk in water, proves difficult. The usual tree stand for maintaining the tree in a vertical position is usually too large to permit placing the trunk in a vessel containing water. Removing the tree stand for this purpose would leave the tree unsupported and is not feasible. Accordingly, many people do not bother to apply water to the base of the tree preferring to take the fire hazard risk which occurs when the tree dries out.

There has been developed a tree stand and watering bowl which consists of a bowl having a metal ring supported by extensions from the sides of the bowl so that a tree which has its trunk inserted in the ring will be held in a vertical position. The diameter of the ring limits the size of the tree tunk which can be accommodated. Obviously, trunk diameters bigger than ring diameters will not fit. Trunk diameters which are much smaller than the ring diameter will not stand vertically but will have some lean. Also, it is necessary to cut off all tree braches below the ring. This detracts from their beauty. Also, these types of stands are expensive and therefore not purchased by many people.

OBJECTS AND SUMMARY OF THE INVENTION

It is an object of this invention to provide an economically priced and disposable arrangement for both maintaining a tree in a vertical position with provision for applying water to the base of the tree.

It is still another object of this invention to provide a combination tree stand and watering device which does not require cutting off any braches of the tree to be used.

Yet another object of this invention is the provision of a tree stand and watering device which can accommodate a tree regardless of the size of its trunk.

It is yet another object of this invention to provide a novel and simple combination tree stand and watering device for the tree.

These and other objects of the invention may be achieved in an arrangement wherein the trunk of a tree has its base applied against the bottom of a container for water for which is made of a material which can be penetrated by nails, for example. Adjacent the outside of the container at the part of the bottom which is opposite the location at which the tree trunk abuts the inside of the container, a coating of a liquid pervious sealant is applied. a tree stand, which consists of two crossed members, is applied with the region at which the two members cross or intersect to the region of the sealant. Then, a number of long nails are hammered through the tree stand through the sealant, through the base of the container, into the trunk of the tree. The combination can then be stood up on the tree support, which holds the tree erect. Water can be poured into the container. The sealant operates to close the openings in the base of the container around the nail holes, so that the water does not leak out. As a result, the tree is maintained in a vertical position and has water applied to the base from whence it is absorbed by the tree, whereby the tree is prevented from drying out.

The novel features of the invention are set forth with particularity in the appended claims. The invention will best be understood from the following description when read in conjunction with the accompanying drawings.

DESCRIPTION OF THE PREFERRED EMBODIMENT

Figure 1:
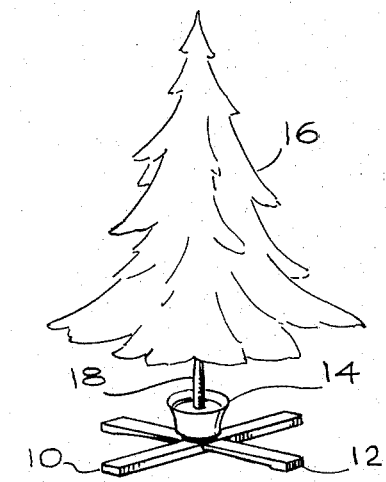
FIG. 1 is a view in perspective illustrating an embodiment of the invention.

Referring now FIG. 1, there may be seen an embodiment of the invention. This comprises a pair of crossed members respectively 10, 12, which cooperate to maintain a tree in a vertical position. These crossed members may be made out of wood, for example. Supported at the intersection of the crossed members is a container 14, which may contain a liquid such as water, for example. A tree 16, has its trunk 18, extending into the container 14 and is supported in a vertical position.

Figure 2:
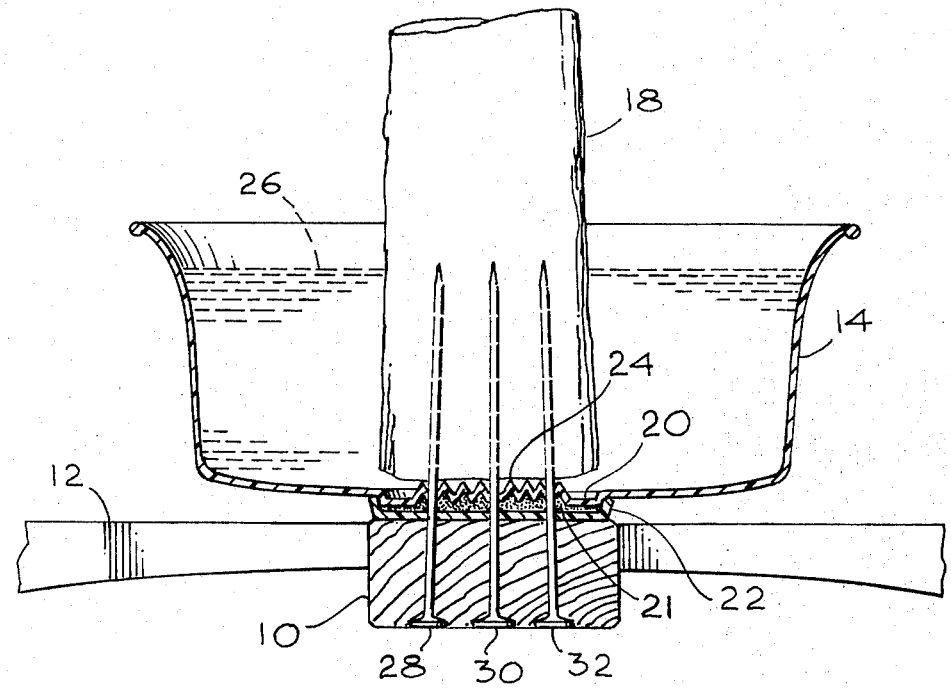
FIG. 2 is a cross-section of an embodiment of the invention.

FIG. 2 is a cross-section of the embodiment of the invention, illustrating the details thereof. At the base of the container 14, adjacent the region to which the trunk 18 is applied, there is a shallow cavity 20 to which there is applied a liquid pervious sealant 21. This may be a material such as an asphalt sealant or a rubber based sealant. In order to maintain the sealant in position, a shallow cup 22 is used to cover over the shallow cavity in which the sealant is placed.

The bottom of the container 14 against which the trunk is applied, has a plurality of ridges 24, which enable water 26, which is poured into the container, to have access to a greater surface area of the bottom of the tree tunk, than it would have if the bottom of the container 14 were flat.

A plurality of nails 28, 30, 32, are hammered through the tree stand, the cup, the sealant, the base of the container 14, into the trunk of the tree. The nails are made long enough so that the tree and the other members of the assembly are securely held together. The sealant closes any openings which might be made by the nails, which could cause a leak in the bottom of the container 14. The container and cap may be made of a suitable plastic material, and the stand made of cross members 10 and 12 may be made of wood, or any other material through which nails can be hammered.

There has therefore been described above a novel, useful and simple combination tree stand and watering device, whereby a tree may be maintained vertical and may have water applied to the trunk thereof for the purposes of preventing it from drying out and becoming a fire hazard.

What is claimed is:

1. A device for watering a tree and holding it erect, comprising:
 a container for liuqid into which the trunk of a tree is inserted until the bottom of said tree trunk is against the bottom of said container,
 said container having a shallow cavity located on its outside bottom adjacent the location at which the bottom of the tree abuts,
 liquid sealant means applied in the shallow cavity of said container,
 a cup for said shallow cavity positioned to close said cavity and to enclose said sealant,
 means for maintaining said tree vertical, and
 means for fastening said means for maintaining said tree vertical to said tree trunk through said cap, through said sealant means, and through the bottom of said container.

2. A device as recited in claim 1 wherein said means for maintaining said tree vertical comprises:
 a pair of elongated members intersecting one another approximately at their centers and attached to said container and tree trunk at the region of intersection.

3. A device as recited in claim 1 wherein the base of said container at the region against which said tree trunk abuts is corrugated to afford a greater access of fluid to the base of said tree trunk.

4. A device as recited in claim 1 wherein said container and cap are made of plastic material and said means for maintaining said tree vertical is made of wood.

5. A device as recited in claim 1 wherein said liquid sealant means constitute an asphalt liquid sealant.

* * * * *